(12) United States Patent
Hedinger

(10) Patent No.: US 8,254,575 B2
(45) Date of Patent: Aug. 28, 2012

(54) METHOD FOR THE ALLOCATION AND MANAGEMENT OF SUBSCRIPTIONS FOR THE RECEPTION OF BROADCAST PRODUCTS

(75) Inventor: Antoine Hedinger, Chatel-Saint-Denis (CH)

(73) Assignee: Nagravision S.A., Cheseaux-Sur-Lausanne (CH)

( * ) Notice: Subject to any disclaimer, the term of this patent is extended or adjusted under 35 U.S.C. 154(b) by 340 days.

(21) Appl. No.: 12/555,240

(22) Filed: Sep. 8, 2009

(65) Prior Publication Data

US 2010/0061554 A1     Mar. 11, 2010

(30) Foreign Application Priority Data

Sep. 9, 2008 (EP) .................................... 08163999

(51) Int. Cl.
*H04L 29/06* (2006.01)
(52) U.S. Cl. ...................................................... 380/269
(58) Field of Classification Search .................... 380/269
See application file for complete search history.

(56) References Cited

U.S. PATENT DOCUMENTS

| | | | | |
|---|---|---|---|---|
| 5,420,923 A | * | 5/1995 | Beyers et al. ................. | 380/234 |
| 6,266,662 B1 | * | 7/2001 | Ozbutun et al. ............... | 707/700 |

FOREIGN PATENT DOCUMENTS

| | | |
|---|---|---|
| AU | 773 927 | 6/2004 |
| WO | WO 98/42090 | 9/1998 |
| WO | WO 2005/022344 | 3/2005 |

OTHER PUBLICATIONS

European Search Report issued in European Application No. EP 08 16 3999.9, dated Mar. 12, 2009.
Yusei Nishimoto et al., "A Conditional Access System for Mobile Broadcasting Systems", 2008 IEEE International Symposium on Broadband Multimedia Systems and Broadcasting, Mar. 31, 2008, pp. 1-2, XP031268566.

* cited by examiner

*Primary Examiner* — Jung Kim
*Assistant Examiner* — Ayoub Alata
(74) *Attorney, Agent, or Firm* — DLA Piper LLP US

(57) ABSTRACT

The method to reduce the bandwidth necessary for the renewal of subscription message is achieved using group messages in which each member of the group is associated with a bit of a bitmap. In order to have the maximum members in a group, the size dedicated for the bitmap is determined first by calculating the size remaining after putting the command and other necessary data into the message, and using an iterative process to determine whether the bitmap, once compressed, will fit this remaining size. The iterative process adds a new member into the group, thus increasing the bitmap size, then compresses the resulting bitmap and checks if the compressed bitmap will fit into the remaining size.

8 Claims, 1 Drawing Sheet

METHOD FOR THE ALLOCATION AND MANAGEMENT OF SUBSCRIPTIONS FOR THE RECEPTION OF BROADCAST PRODUCTS

INTRODUCTION

This invention concerns the management of a set of subscribers to broadcast services subject to conditional access.

PRIOR ART

Visual or audio services are transmitted in the form of a data stream to receivers, such as home receivers (set-top-box) or mobile receivers. By way of example a data stream could be a stock-exchange data service, a weather forecast, general-purpose television, a sports event broadcast and so on. These contents can be broadcast on user units such as a Pay-TV decoder, a computer or even a mobile phone, a "palm-top", a PDA, a radio, a television, a multimedia terminal.

The digital data stream is encrypted in order to be able to restrict the use and define the conditions for such use. This encryption is accomplished thanks to control words which are changed at regular interval (between 5 and 30 seconds) in order to dissuade any attack aimed at discovering such control words.

In order to allow the user unit to decrypt the data stream encrypted by a control word, the latter is sent independently of the data stream in a control message (ECM) encrypted by a key used in the system allowing for the transmission between the management centre (CAS) and the security module of the user unit. Indeed, the security operations are carried out in a security module (SC) which is a tamper-proof device. This module process the messages related to the rights of the receiver.

At the time of the decryption of the control message (ECM), the access right to the considered data stream is verified in the security module (SC). The control word is returned in clear to the to user unit only when the verification is positive.

It is well known to a person skilled in the art, that the security module can essentially be realized according to any of four distinct forms. One such form is a microprocessor card, a smart card, or more generally an electronic module (having a form of key, or a badge etc). Such a module is connectable and generally removable from the decoder. The form with electric contact is the most used, but the version without contact for instance of type ISO 14443 is also used. It can also take the form of an SD card, microSD, MMC, memory stick, or any other form of memory card.

In a second known form, the security module is integrated in an electronic circuit package, mounted generally in a permanent and non-removable way in the decoder box. An alternative is made of a circuit package mounted on a connector such a SIM module connector.

In a third form, the security module is integrated in an integrated circuit package having also another function, for instance in the decoder's descrambling module or the decoder's microprocessor.

In a fourth embodiment, the security module is not physically realized, but its function is implemented in the form of software. Given that in the four cases, although the security level differs, the function is identical, we can refer to security module whatever way its function is realized or the form that this module takes.

The reception rights are generally managed by authorization messages (EMM) which are loaded into the security module (SC). Other possibilities are also possible such as sending decryption keys.

It is well known that such security modules include a unique identification number UA0 loaded into the memory during an initialization phase. At the time of the subscription to a television service, the security module (SC) receives a subscriber identification number UA1 which will be used later in a group addressing method.

According to an example in which the size of the group of subscribers is 512, the 9 lower bits of the subscriber identification number UA1 will be ignored and the receiver will filter the address of UA1 based on the bits of higher significance than that of the $9^{th}$ bit.

It is the subscriber identification number UA1 which will serve to address the security module in a group basis or on an individual addressing, the unique number UA0 being used on individual addressing. This is the case at the time of a subscription modification, for instance the recording in the security module of a subscription right for a new product.

Thus, the receiver will configure its message filter in order to pass the messages containing in the header the unique identification number UA0 or the subscriber identification number UA1. These numbers are transmitted by the security module to the receiver in order to initialize its filter.

The subscription management is managed according to the principle of rights renewal i.e. that rights are linked with an expiry date after which the security module refuses to consider his rights as valid. In order for the subscriber to be able to continue to take advantage of his subscription without interruption it is thus necessary to transmit a rights renewal message (in so for as the subscriber has the right to receive it) postponing the expiry date till later.

In practice, the duration of a renewal is typically 1 month, which means that all receivers must receive a renewal message within a month. Since we are in a broadcast environment, the management centre does not know when the receivers are switched on and this is the reason why the messages are repeated many times.

To reduce the number of messages to be sent, it has been proposed to use group addressing rather than individual addressing. In case that a provider proposes 5 products for subscription, it will then be necessary to send 5 rights renewal messages per group, each message comprising the renewal conditions for a product. Since not all the group members will have subscribed to the product related to this message, a group message thus comprises a field of bitmap type with one bit dedicated to each member of the group. If a group contains 256 members, the bitmap field will contain 256 bits, each bit being dedicated to a specific security module.

The security module, at the time of reception of the group message, will first verify if its own bit is at 1 to know if the renewal command is intended for it. If the bit is at 0, it will ignore the renewal control, or even clear the subscription right considered by this message.

It is apparent that such a message is encrypted and that only the security modules have access to the key to decrypt it. Moreover, the message contains authentication data ensuring that only the designated authority can generate such message. This is done thanks to asymmetrical key cryptography.

One of the problems encountered is of course the large number of renewal messages to be sent and therefore the use of available bandwidth, the latter being best used for audio-visual services. In our example with 5 products, each subscriber having subscribed to one product, the bitmap will be on average filled to 20% with 1's and to 80% with 0's, given that the products are uniformly distributed among the subscribers. This is the ideal situation and is rather unlikely. The bitmap will in fact have an unpredictable structure, some groups having a large number of participants having subscribed for a specific product and other groups having a small number of participants having subscribed to this same product. This entropy makes the compression of the bitmap very difficult.

One can imagine the necessary bandwidth when more that 2 million subscribers should be managed. An approach therefore consists in increasing the size of the groups (1024 or more) to reduce the number of messages but it will then be necessary to increase the size of the messages to be able to contain a bitmap of 1024 or even more, thus having the effect of increasing the bandwidth used by these messages and reducing the gain achieved by the group messaging technique. It can be seen that the increase of the group size can only be a partial solution.

Another problem which has been observed is the volatility rate of the client-base which subscribe and then unsubscribe some months later. The subscription number initially allocated to such a subscriber can no longer be used. Indeed, the rights are still present in the first receiver (or security module) at the moment of the end of the subscription. To bypass the access control system, the owner needs simply to interrupt the reception of the messages containing a zero in the bitmap signalling an erase command. If this subscription number is furthermore reallocated to a second receiver some months later, the first receiver needs simply to be switched on in order for the renewal messages to be received and for the rights to be unjustly updated, allowing for the undue reception of audiovisual services.

To avoid this, the number allocated to a subscriber is no longer used after its expiry. The arrival of new subscribers leads to the creation of new groups while older groups shrink and contain only a few subscribers for which it is nevertheless necessary to send a group message.

BRIEF DESCRIPTION OF THE INVENTION

The aim of the present invention is to propose a method to reduce the bandwidth necessary for the renewal of subscriptions to the reception of broadcast services.

This aim is achieved by a method for the managing group messages for at least one receiver comprising a security module, this module comprising an identification address UA, this method being carried out by a management center and comprising the following steps:

A. defining a maximum length for a group message,
B. defining a group command for a plurality of security modules,
C. forming a group message comprising at least the group command,
D. filling the group message with a starting address UA1 and a range LG,
E. determining a remaining length in the group message following the steps C and D,
F. defining a bitmap of variable length,
G. starting at identification address equal to the starting address UA1 and initializing an index value and the bitmap length,
H. updating the bit of the bitmap for the security module pertaining to the identification address to activate/deactivate the command for said security module,
I. compressing the bitmap,
J. checking if the compressed bitmap length is smaller than the remaining size in the group message, in the positive event, updating the index value, the bitmap length and the identification address, re-executing the steps H to J
K. updating the range in the group message with the index value and filling the group message with the bitmap.

A group message according to the invention is addressed to a dynamic number of users. The range is not defined in advance but is defined according to the remaining space or size in the message after the command is placed in said message.

Not only the remaining place is relevant to determine the range, the compression ratio of the bitmap plays an important role. The bitmap is used to individually address a member of the group. The bit related to this member is either 0 or 1 depending on the fact that the command is to be executed by this member. The bit activates or deactivates the command. Therefore, the content of the bitmap is not predictable and the compression ratio can vary. The process is running until the size of the compressed bitmap fills the remaining place in the group message. The range is at that time adjusted in the group message so that the group message contains the start address, the range of the addresses devices, the command and the compressed bitmap.

It is to be noted that the range can be replaced by the end address, or a part of the end address i.e. the last 4 digits.

BRIEF DESCRIPTION OF THE DRAWINGS

The invention will be better understood thanks to the following detailed description and with reference to the attached drawings which are given as a non-limiting example, namely.

DETAILED DESCRIPTION

The present invention aims at optimizing the bandwidth used for addressing a large number of security devices in a broadcast environment. Due to the various commands sent via EMM messages, the length of the message can vary depending on the length of the command.

In previous systems, the subscribers are divided into groups taking into account the larger command and the maximum length of a message. The bitmap is then calculated for a specific command and the messages are sent into the broadcast network.

Figure 1:
FIG. 1 shows a group message.
Figure 2:
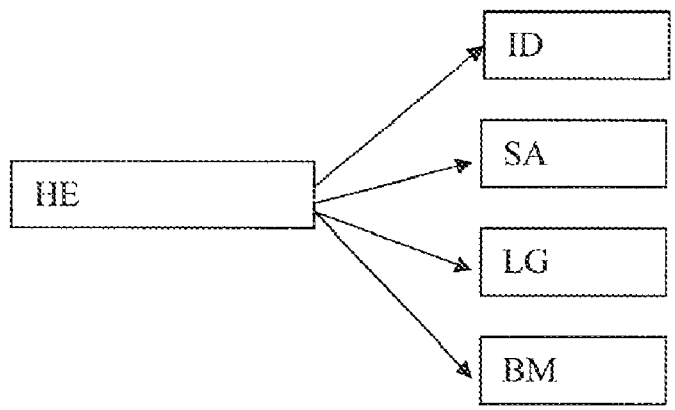
FIG. 2 shows the header of the group message.

As illustrated in the FIG. 1, a group message comprises two parts, i.e. the header part HD and the command part CMD.

The header part HD comprises identification data ID such as the type of the message, the encryption status etc. The header HD also comprises a start address UA1 of the first security module for which the message is foreseen, a range LG defining all security modules for which this message is foreseen and a bitmap BM.

The bitmap is a bit field in which a bit is dedicated to one member of the group. The bitmap can contain 256, 512 or 1024 bits initially and the state of each bit is determined according to the fact that the targeted member has to execute the command or not.

According to the invention, the first step is to determine the maximum length of the message. Secondly, the command is generated and the length of the command is determined. Taking into account the necessary identification data ID of the message, the range LG and the start address UA1, the remaining size is calculated by the difference between the command size and the maximum size.

From that point, a variable size bitmap is generated, e.g. 16 bits. Once the value of these bits is determined, the bitmap is compressed using known algorithm such as Run Length Encoding. An index value is used to scan the security modules from the security module pertaining to the starting address and further. The index value, when the process is completed, represents the range, i.e. the number of security modules processed.

The length of the compressed bitmap is compared with the remaining length and the process is re-executed until the remaining length is full.

The bitmap is extended preferably block by block and compressed so as to determine the length of the compressed bitmap and to compare the length of the compressed bitmap with the remaining length of the group message. In this case, the index value is updated according to the size of the block, once the block is processed.

If the group message is not full, the next block is processed. For example, the current bitmap is 256 bits, the next step is to add 32 bits to the bitmap, and to determine the state of the bits for these 32 members of the group and compress the resulting bitmap of 288 bits.

When the group message is full or cannot accept another block, the group message can be generated with the compressed bitmap and the command. The group message will also contain the address of the first security module for which the message is foreseen and the range of security modules for which the message is foreseen resulting from the index value. This second information i.e. the range of security modules can be replaced by the address of the last security module.

It is to be noted that the range has a value, i.e. the number of addressed security module for that message and is encoded according to a range length. In the previous embodiment described, the range length was predefined before starting the optimization process. In some cases, it could be interesting to adjust the range length according the range value. In case that only 132 security modules are addressed by a message, it is not necessary to encode this value with 16 bits (i.e. the range length).

During the optimization process, the range length can vary. according the increase of the index value. The length of the compressed bitmap and the updated range length is taken into account to determine the remaining place in the group message.

The invention claimed is:

1. A method for the managing group messages for at least one receiver comprising a security module, the security module comprising an identification address, this method being carried out by a management center and comprising the steps of:
    a. defining a maximum length for a group message;
    b. defining a group command for a plurality of security modules;
    c. forming a group message comprising at least the group command;
    d. adding a starting address and a range to the group message;
    e. determining a remaining length in the group message, the remaining length being a length in the group message that would remain available after steps c and d are performed;
    f. defining a bitmap of variable length;
    g. setting the identification address equal to the starting address and initializing an index value and the length of the bitmap;
    h. updating the bit of the bitmap for the security module pertaining to the identification address to activate/deactivate the command for said security module;
    i. compressing the bitmap;
    j. determining whether a length of the compressed bitmap is smaller than or equal to the remaining length in the group message and, if the length of the compressed bitmap is smaller than or equal to the remaining length in the group message, updating the index value, the length of the bitmap and the identification address and re-executing the steps h to j;
    k. updating the range in the group message based on the index value and updating the group message with the compressed bitmap having the largest length able to fit in the remaining length.

2. The method of claim 1, wherein the step h is executed for a block of security modules, the index value being updated with the block size.

3. The method of claim 2, further comprising the steps of:
    defining, an initial range length;
    determining that the index value is equal to or exceeds the range length;, and
    adjusting the range length and updating the remaining length of the group message.

4. The method of claim 1, further comprising the steps of:
    defining an initial range length;
    determining that the index value is equal to or exceeds the range length; and
    adjusting the range length and updating the remaining length of the group message.

5. A system comprising:
    at least one receiver comprising a security module, the security module having an identification address; and
    a management center, the management center being configured to perform the steps of:
        a. defining a maximum length for a group message;
        b. defining a. group command for a plurality of security modules;
        c. forming a group message comprising at least the group command;
        d. adding a starting address and .a range to the group message;
        e. determining a remaining length in the group message, the remaining length being a length in the group message that would remain available after steps c and d are performed;
        f. defining a bitmap of variable length;
        g. setting the identification address equal to the starting address and initializing an index value and the length of the bitmap;
        h. updating the bit of the bitmap for the security module pertaining to the identification address to activate/deactivate the command for said security module;
        i. compressing the bitmap;
        j. determining whether a length of the compressed bitmap is smaller than or equal to the remaining length in the group message and, if the length of the compressed bitmap is smaller than or equal to the remaining length in the group message, updating the index value, the length of the bitmap and the identification address and re-executing the steps h to j;
        k. updating the range in the group message based on the index value and updating the group message with the compressed bitmap having the largest length able to fit in the remaining length.

6. The system of claim 5, wherein the step .h is executed for a block of security modules, the index value being updated with the block size.

7. The system of claim 6, wherein the management center is further configured to perform the steps of:
    defining an initial range length;

determining that the index value is equal to or exceeds the range length; and adjusting the range length and updating the remaining length of the group message.

8. The system of claim 5, wherein the management center is further configured to perform the steps of:

defining an initial range length;

determining that the index value is equal to or exceeds the range length; and adjusting the range length and updating the remaining length of the group message.

* * * * *